No. 882,584. PATENTED MAR. 24, 1908.
H. RASMUSSEN.
HARNESS FOR HORSE TRAINING.
APPLICATION FILED OCT. 8, 1906.

UNITED STATES PATENT OFFICE.

HANS RASMUSSEN, OF SKOVGAARDE, DENMARK.

HARNESS FOR HORSE-TRAINING.

No. 882,584.　　　　Specification of Letters Patent.　　Patented March 24, 1908.

Application filed October 8, 1906. Serial No. 338,046.

*To all whom it may concern:*

Be it known that I, HANS RASMUSSEN, a subject of the King of Denmark, and resident of Skovgaarde, Præst county, Denmark, have invented a new and useful Improvement in Harness for Horse-Training, which improvement is fully set forth in the following specification.

The present invention relates to harness for use in training horses, and, more specifically, is a device for holding the head of the animal in the proper position so that the horse's neck secures the desired bend; in short, by the use of the present invention, to insure that the horse is well gathered, *i. e.*, so held as to be best capable of work, this also resulting in the animal being endowed with a smart appearance. Briefly stated, the desired end is attained by the use of a girth element or saddle, to which is secured a forwardly projecting portion which engages the withers of the animal (thus obviating the necessity of a crupper), the check reins employed being secured at one end to the bit, as usual, and at the other end to a bow mounted on said saddle or girth element.

The invention will be better understood by reference to the accompanying drawings, wherein—

Figure 1:
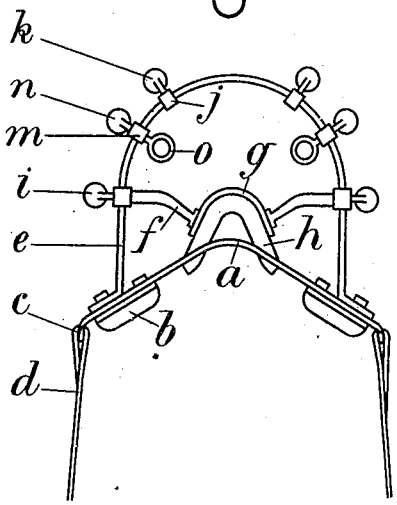
Figure 2:
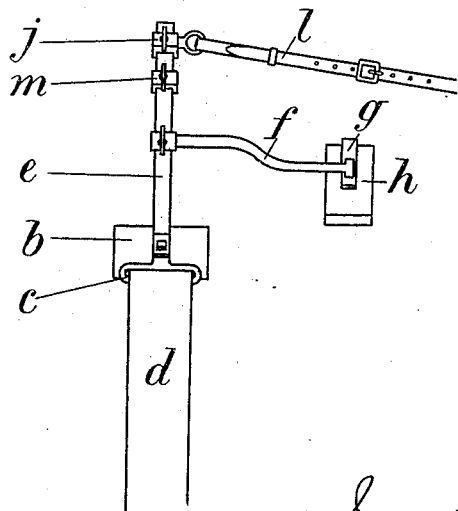

Figure 1 is a rear view of the device; and Fig. 2 is a side view thereof.

Referring to the drawings, $a$ is a saddle or girth element provided with pads $b$ $b$, and $c$ are eyelets in which are secured the girth straps $d$ as usual; the said device being placed on the horse at the same place as, and being similar to, the usual harness saddle. To the saddle element $a$ is suitably secured, at both its ends, a vertically extending bowed or curved member $e$ to which are attached the several elements hereinafter indicated.

In order to prevent the device being pulled forward or displaced, and at the same time avoid using a crupper, a vertically-adjustable forwardly-extending device is provided for engaging a portion of the animal's anatomy forward of the position occupied by the saddle $a$. This device is composed of pad $h$ which rests on the horse's withers, said pad being fastened to a forwardly extending substantially U-shaped member which is composed of a vertically curved element $g$—to which the pad $h$ is directly secured—and connecting pieces or arms $f$, secured at their forward ends to curved element $g$ near its extremities, and at their rear ends to bow $e$. This U-shaped device is vertically adjustable as a whole on the bow $e$, through the medium of adjusting screws $i$, in order that the device may be adapted to animals of varying sizes. At the top of the bow $e$ are two adjustable lugs $j$ secured in the desired positions by screws $k$. Reins $l$ are fastened to the lugs $j$, and to the bit-rings in the usual manner. There are likewise adjustably mounted on bow $e$ lugs $m$ which are fixed in the desired positions by screws $n$. These lugs are provided with rings $o$ through which the driving reins are passed, if desired.

To secure the device in position the pad $h$ is placed in engagement with the animal's withers, the U-shaped frame to which it is fastened being vertically adjusted to the proper height, and the girth straps are then secured. The reins $l$ which are secured at one end to the bit-rings, are passed through the eyelets in lugs $j$, and the reins are then fastened to hold the horse's head in the desired position, with the neck of the horse properly curved. The driving reins are passed through rings $o$, if desired.

The forwardly-extending U-shaped device, bearing the pad $h$ which engages the withers, performs the functions of a crupper, preventing the device from being pulled forward or displaced.

What is claimed is:

1. In a harness, a saddle or girth element, a pad engaging the withers, and a vertically movable arm connected to the saddle or girth element and on which said pad is mounted and with which it is movable.

2. In a harness, a saddle or girth element, a bow mounted thereon, an arm connected to said bow and vertically movable thereon, and a pad engaging the withers and mounted on said arm.

3. In a harness, a saddle or girth element, a bow mounted thereon, a forwardly projecting element vertically adjustable on said bow, and a pad engaging the withers and connected to said element.

4. In a harness, a saddle or girth element, a bow mounted thereon, a pad engaging the withers, and arms connecting said bow and pad.

5. In a harness, a saddle or girth element, a bow mounted thereon, a pad engaging the withers, and arms connecting said bow and pad and vertically adjustable on said bow.

6. In a harness, a saddle or girth element, a bow mounted thereon, a pad engaging the withers, connections between said bow and pad, and adjustable lugs secured to said bow to which the check reins are attached.

7. In a harness, a saddle or girth element, a bow mounted thereon, a pad engaging the withers, connections between said bow and which the check-reins are attached, and other pad, and adjustable lugs secured to said bow through which the driving reins are passed.

8. In a harness, a saddle or girth element, a bow mounted thereon, a pad engaging the withers, connections between said bow and pad, adjustable lugs secured to said bow to which the check reins are attached, adjustable lugs secured to said bow through which the driving reins are passed.

9. In a harness, a saddle or girth element, a bow mounted thereon, adjustable lugs secured to said bow to which the check-reins are attached, and other adjustable lugs secured to said bow through which the driving reins are passed.

In testimony whereof I have signed this specification in the presence of two subscribing witnesses.

HANS RASMUSSEN.

Witnesses:
JAN CHRISTOPHERSEN,
VIGGO BLOM.